J. C. POTTER & J. JOHNSTON.
TOOL OPERATING MECHANISM FOR LATHES.
APPLICATION FILED MAR. 7, 1903.
1,007,141.
Patented Oct. 31, 1911.
2 SHEETS—SHEET 1.
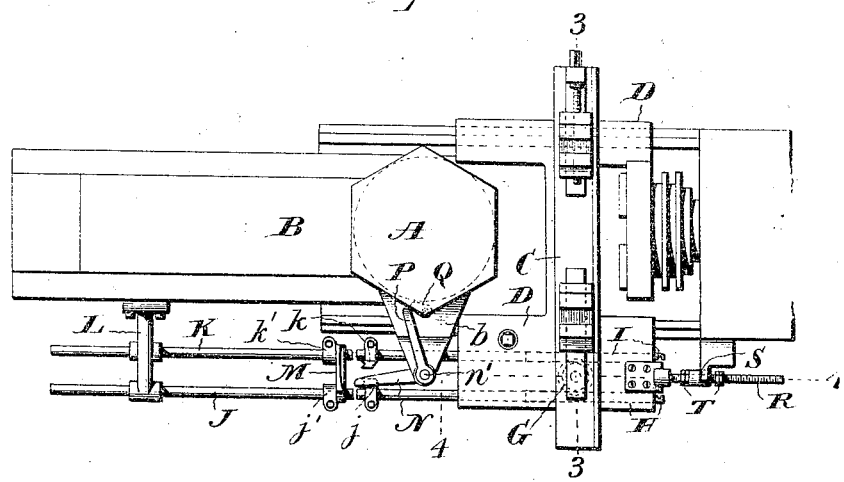
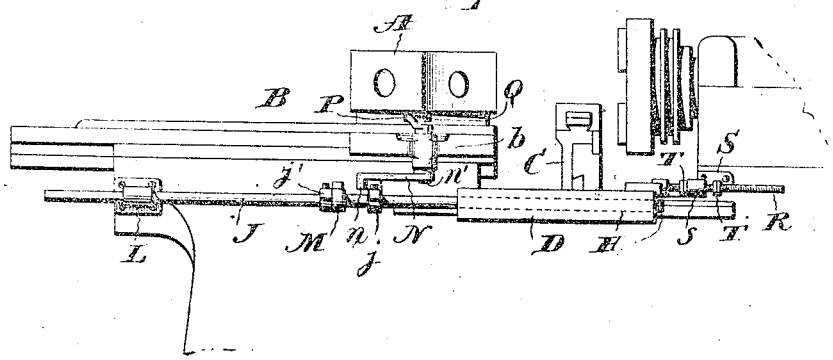
Witnesses:
Jas. E. Hutchinson
Chas. J. Williamson
Inventors:
Jas. C. Potter and Jno. Johnston,
by Edwin J. Prindle, their Atty.

J. C. POTTER & J. JOHNSTON.
TOOL OPERATING MECHANISM FOR LATHES.
APPLICATION FILED MAR. 7, 1903.
1,007,141.
Patented Oct. 31, 1911.
2 SHEETS—SHEET 2.
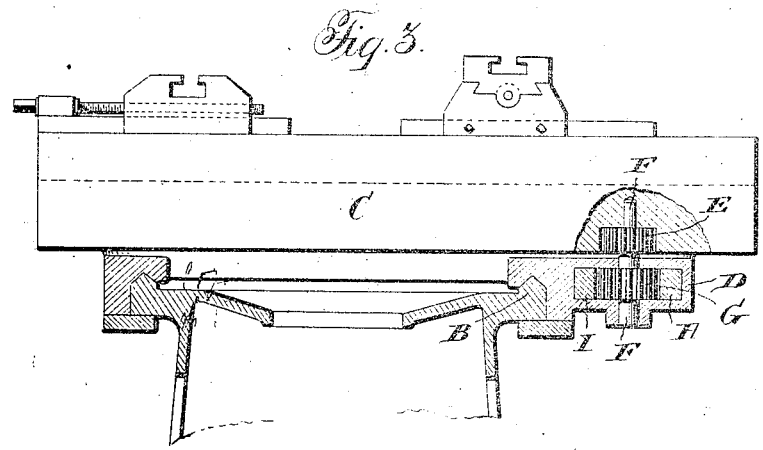
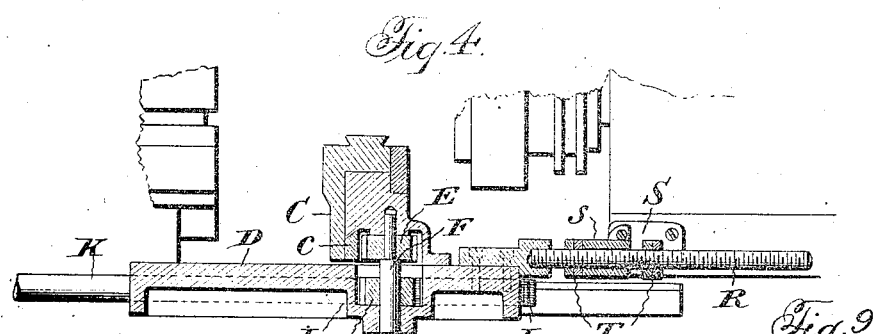
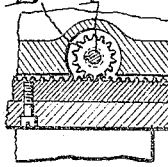
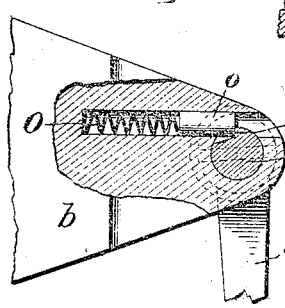
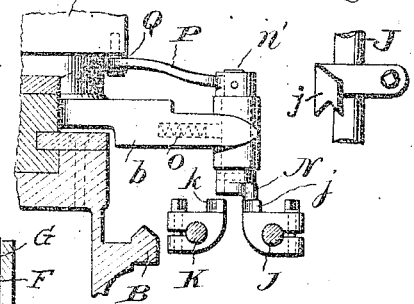
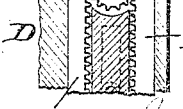
Witnesses:
Jas. E. Hutchinson
Chas. J. Williamson
Inventors.
Jas. C. Potter and Jno. Johnston,
by Edwin J. Prindle, their Atty.

UNITED STATES PATENT OFFICE.

JAMES CHARLES POTTER AND JOHN JOHNSTON, OF PAWTUCKET, RHODE ISLAND, ASSIGNORS TO POTTER & JOHNSTON MACHINE COMPANY, OF PAWTUCKET, RHODE ISLAND, A CORPORATION OF RHODE ISLAND.

TOOL-OPERATING MECHANISM FOR LATHES.

1,007,141.

Specification of Letters Patent. Patented Oct. 31, 1911.

Application filed March 7, 1903. Serial No. 146,725.

*To all whom it may concern:*

Be it known that we, JAMES C. POTTER, a citizen of the United States, and JOHN JOHNSTON, a subject of the King of England, of Pawtucket, in the county of Providence and in the State of Rhode Island, have invented a certain new and useful Improvement in Tool-Operating Mechanism for Lathes, and do hereby declare that the following is a full, clear, and exact description thereof, reference being had to the accompanying drawings, in which—

Figure 1 is a top, plan view of enough of a turret lathe to illustrate our invention; Fig. 2 is a side elevation thereof; Fig. 3 is a cross-section on the line 3—3 of Fig. 1; Fig. 4 is a section on the line 4—4 of Fig. 1; Fig. 5 is a detail view, in section, of the arm-latching device. Fig. 6 a detail view in cross section, partly in elevation, of the cross-slide actuating devices; Fig. 7 is a detail view showing the pinion engaging with a rack on the cross slide; Fig. 8 is a like view showing the racks and pinion for operating the cross-slide; and, Fig. 9 is a detail plan view of the two tappets of the cross-slide operating mechanism.

Our invention relates to lathes in which automatically operated cross-slides are employed, and the object of our invention is to simplify the mechanism for producing the movements of the cross-slide, and to prevent tool marks on the work, which are produced by the dragging of the tool across the face of the work, and to these ends, our invention consists in the mechanism having the features of construction substantially as hereinafter specified and claimed.

The lathe which we have selected to illustrate an embodiment of our invention is of the well-known turret type, having a tool carrying turret A mounted upon a main slide B that is reciprocable toward and from the work in a direction parallel with the axis of the head-stock spindle. As the construction of the turret and the mechanism by which the main slide is operated form no part of the present invention, they will not be described. The cross-slide C is mounted upon a carriage D that is slidable toward and from the work on suitable ways on the upper side of the frame or bed of the lathe. The carriage D may be shifted to the desired position by hand. Attached to the cross-slide, at the lower side thereof, is a rack bar $c$, with which meshes a pinion E on a vertical shaft F journaled in bearings in the carriage D. Beneath the pinion E on the shaft F is a second pinion G, and meshing with the latter at opposite sides thereof are two rack-bars H and I that extend at right angles to the cross-slide and its rack-bar $c$.

The rack-bars H and I are attached to, or are extensions of, rods J and K, respectively, which at their opposite ends pass loosely through and are supported by a bracket L on the bed of the lathe. It will be seen that by the reciprocation of either of the rods, the cross-slide will be reciprocated and the tools thereon moved to perform their work and then retracted. There are two rods and rack-bars provided, because, usually, there are two tools on the cross-slide which act upon the work from opposite sides of the head-stock spindle, one rod and rack-bar thus serving to move one tool to perform its work and then to retract it, and the other rod and rack bar serving the like purpose for the second tool. On the rods J and K are similar blocks $j$ and $k$, respectively, that are secured to the rods by clamps, so that they may be adjusted along the same, each block having on one side a simple inclined surface, and on the opposite side a notch or cavity, of a V-shape preferably. Also on said rods are two collars $j'$ and $k'$, respectively, lengthwise adjustable along the rods, and a cross-bar M that extends from one rod to the other and is free to slide thereon and is designed to abut against the two collars $j'$ and $k'$. Pivoted to a lateral extension or projection $b$ of the main slide B is a horizontally swinging arm N, having projecting downward from its extremity a lug $n$ adapted to co-act with either of the blocks or tappets $j$ and $k$, and the extremity of said arm being adapted to engage the cross-bar M. When the lug of the arm N engages the notched side of the of the tappets and is moved in the proper direction, being carried by the main slide, it will be seen that it will carry with it the rod to which said tappet is secured, and thus through the racks and pinions move the cross-slide in one direction. When moved in the reverse direction, the end of the arm N, encountering the cross bar M, will, through the contact between the latter and the appropriate collar $j'$ or $k'$, move the rod in the reverse direction, and thus, through the racks and pinions, return the cross-slide to its former position.

Ordinarily, if one tool at a time is used, the tools being used alternately, and provision being made, as hereinafter described, for determining which of the two tools shall be used. Speaking with reference to Fig. 1, the tool on the far side of the cross-slide C has its movements effected by the rod J, it being moved to do its work when the turret carriage moves toward the head stock, while the movements of the tool on the inner side are effected by the rod K. The collars $j'$ and $k'$ with which the cross-bar M coacts to effect the retraction of the rods J and K are given such position with reference to the travel of the turret slide or carriage that when one rod is not being used, and is fully retracted, while the other rod is being used, the position of the collar of the rod not being used will agree with the fully retracted position of the turret slide, so that the cross-bar M will cease its retracting movement when it abuts against the said collar of the rod not being used.

The arm N is mounted on a pivot shaft $n'$ having in its side a V-shaped notch $n^2$ for coöperation with a spring pressed pin $o$, slidably mounted in a hole in a lateral extension of the turret slide. The pin $o$ pressing at its outer end on a radial wall of the notch $n^2$ and having its side engaged by the other wall of the notch, yieldingly holds the arm N in position to engage the tappet $k$. For swinging the arm N in position to engage the other of the tappets, a lever P is attached to the shaft $n'$, and has its free end in position to be engaged by a pivoted block or button Q carried by the turret, said button, by the revolution of the turret, being moved to and from position to engage said lever, and thus the time of opperation of the cross-slide tool being automatically determined by the turret. The button Q has such form that, when turned in one position, it will cause the lever to swing to place the arm so that it will engage one of the tappets, and when turned to another position, it will cause the lever to place the arm for engagement with the other tappet, the button being turned from one position to another by hand, according as it is desired to use one tool on the cross-slide or the other tool thereon. One or any number of buttons can be attached to the turret, according to the number of times it is desired that the cross-slide shall be moved during the complete revolution of the turret. When the arm N is on that side of the tappets where they have simple inclined surfaces, and the arm by the movement of the slide is moved toward the tappets, its end, if it be set by the button to coact with one or the other of the tappets, will engage the inclined side of such tappet and the arm thereby swung sidewise to permit it to pass to the opposite side of the tappet, in readiness to engage therewith on the movement of the main slide in the opposite direction.

It will be seen that the time for the automatic movement of the cross-slide is automatically fixed, and that by means of our mechanism the main-slide operating devices are availed of to effect the reciprocation of the cross-slide, separate operating mechanism for moving the cross-slide being thus rendered unnecessary.

Attached to, and extending from, the cross-slide carriage D, toward the headstock, and parallel with the head-stock spindle axis, is a threaded rod or screw R, which passes freely through an eye $s$ in a bracket S fastened to the side of the lathe bed. On the screw on opposite sides of the bracket-eye are nuts T, separated a sufficiently greater distance than the length of the eye, to permit movement of the rod or screw before the nuts strike said eye. By reason of the devices just described, when one of the rack bars is moved to operate the cross-slide to cause one of its tools to act on the work, the cross-slide carriage will first be bodily moved toward the head-stock, and when the nut next the carriage strikes the bracket-eye $s$, such movement of the cross-slide carriage will be arrested, and then the rack-bar, acting on the pinion, will cause the traverse of the tool across the work to perform its cutting operation. When the cross-slide tool is to be retracted, the reverse movement of the operating rack-bar will first result in the bodily movement of the cross-slide carriage away from the head-stock longitudinally of the bed until the nut T on the opposite side of the bracket-eye $s$ engages the latter, whereupon backward movement of the carriage being arrested, the cross-slide will be moved, carrying the tool to its former position, and, as the tool will have thus been carried away from the work a distance equal to the difference between the length of the bracket-eye and the space between the nuts T the tool will not touch the work in being retracted, and thus no tool mark on the work will be formed.

The described bodily movement of the cross slide carriage toward and from the work is due to the fact that the resistance to cross-wise movement of the cross slide by the action of the racks and pinions is greater than the resistance of the cross-slide carriage along the lathe bed toward and from the work. That is to say, the bodily movement of the cross-slide carriage toward and from the work longitudinally of the bed takes place first, and must be arrested before the revolution of the pinions can take place, which is necessary to move the cross-slide laterally. The rods J and K are not attached to the carriage D, but they are free to move independently thereof, except when the resistance offered by the cross slide to lateral movement is sufficient to prevent rotation of the pinions G and E by the action of one or the other rod.

Having thus described our invention what we claim is:—

1. In a lathe, the combination of two slides mounted independently of each other, a turret on one of the slides, means for causing movement of one of the slides from the other, and a turret-carried part rotating with the turret that controls said means.

2. In a lathe, the combination of two slides, mounted independently of each other, a turret on one of said slides, said turret-carrying slide being reciprocable, means whereby movement may be transmitted from the turret-carrying slide to the other slide, and a turret-carrying part rotating with the turret to control said means.

3. In a lathe, the combination of a turret-carrying slide, a cross-slide mounted independently of the latter, means for transmitting movement from the turret-carrying slide to the cross-slide, and a turret-carrying part rotating with the turret that controls said means.

4. In a lathe, the combination of a turret, a slide mounted independent of the turret, means for operating said slide, and a turret-carried part rotating with the turret that controls said means.

5. In a lathe, the combination of a turret, a cross slide, means for moving said cross slide, and means controlling the operation of the cross slide moving means including a turret actuated part.

6. In a lathe, the combination of a turret-carrying slide, a second slide mounted independent of the turret-carrying slide, means for transmitting motion from the turret-carrying slide to the other slide, and means for automatically controlling the operation of said second slide, comprising a movable arm in the path of a part carried by the turret.

7. In a lathe, the combination of a turret-carrying slide, a cross slide mounted independent of the turret-carrying slide, mechanism for moving the cross slide, a movable arm carried by the turret-carrying slide, controlling the operation of the cross slide-operating mechanism, and a part carried by the turret to actuate said arm.

8. In a lathe, the combination of a turret-carrying slide, a cross slide, rack and pinion operating mechanism for the cross slide, an arm on the turret slide adapted to actuate the rack, a lever connected with said arm, and a pivoted block carried by the turret to act on the lever.

9. In a lathe, the combination of a turret-carrying slide, a cross slide, rack and pinion mechanism for operating the cross-slide, a lever on the turret slide arranged to connect and disconnect said rack and pinion mechanism with the turret slide, and a pivoted part on the turret to position said lever.

10. In a lathe, the combination of a main tool slide, a cross slide, a plurality of tool-holders on the cross slide on opposite sides of the lathe-axis, respectively, a plurality of operating mechanisms for the cross-slide, and one of said mechanisms so constructed and arranged as to move the cross-slide in a direction the reverse of that direction in which moved by another mechanism, and means for coupling the main slide and any one of said plurality of mechanisms.

11. In a lathe, the combination of a main slide, a cross slide, a plurality of tool holders on the cross slide on opposite sides of the lathe axis, respectively, a plurality of reciprocating rods for actuating the cross slide, one of the said rods moving the cross slide in a direction the reverse of that direction in which it moved by another rod, and a movable arm carried by the main slide that coacts with said rods at different times.

12. In a lathe, the combination of a main tool slide, a cross slide, a rack bar thereon, two rack bars extending parallel to the movement of the main slide, and having a pinion between their opposite teeth engaging with the rack on the cross slide, a pinion connected to the other pinion engaging said rack bars, and an arm pivoted to the main slide so as to operate either of said two rack bars.

13. In a lathe, the combination of a main slide, a turret thereon, a cross-slide, a reciprocating rod to actuate the cross-slide, an arm on the main slide, two parts on the rod adapted to coöperate with the said arm to cause movement of the rod, first in one direction and then in the opposite direction, and means rotating with the turret to move said arm.

14. In a lathe, the combination of two slides, one of which is mounted for movement in two directions, means limiting the movement in one of such directions, said means being part of the instrumentality for moving the slide in its other direction, means for operatively connecting them so that movement of one slide is transmitted to the other, and means whereby the movements of the slide which are in different directions may be successively imparted thereto.

15. In a lathe, the combination of a slide which is mounted for movement cross-wise and longitudinally of the lathe, a second slide, means for operating said second slide and means for producing such movements of said first slide by the movement of said second slide, such means including a loose connection and a stop device, whereby movement first in one direction and then in the other direction is caused.

16. In a lathe, the combination of a cross slide, a carriage on which it is mounted, movable lengthwise of the lathe, a second slide, means for operating said second slide and means for imparting movement from said second slide to the cross-slide, comprising loose connections between them, and a stop device whereby the cross-slide and the cross-slide carriage are moved one after the other.

17. In a lathe, the combination of a cross slide, a carriage therefor that is movable at right angles to the direction of movement of the cross slide, rack and pinion mechanism for moving the cross slide, a rod attached to the carriage, and a stop device including parts on the rod, and a relatively fixed piece that co-acts with them.

In testimony that we claim the foregoing we have hereunto set our hands.

JAMES CHARLES POTTER.
JOHN JOHNSTON.

Witnesses:
  DEXTER B. POTTER,
  WILLIAM J. GRAY.